United States Patent [19]
Roth

[11] 3,855,138
[45] Dec. 17, 1974

[54] INTUMESCENT COMPOSITION

[75] Inventor: Shirley H. Roth, Highland Park, N.J.

[73] Assignee: Cities Service Company, New York, N.Y.

[22] Filed: Mar. 10, 1972

[21] Appl. No.: 233,719

[52] U.S. Cl. ............... 252/81, 106/15 FP, 117/136, C09d/5/18
[58] Field of Search ................. 252/8.1; 117/136; 106/15 FP

[56] References Cited
UNITED STATES PATENTS
3,475,199  10/1969  Wolf .............................. 252/8.1 X Primary Examiner—Mayer Weinblatt
Attorney, Agent, or Firm—Patricia J. Hogan

[57] ABSTRACT

Non-flaming intumescent compositions are obtained by mixing a normally self-extinguishing intumescent agent with an amine having a nitrogen or combined nitrogen-halogen content of at least about 30% by weight. The amine may be aliphatic, aromatic, or heterocyclic but is preferably melamaine, a melamine derivative, or other cyclic compound.

10 Claims, No Drawings

INTUMESCENT COMPOSITION

BACKGROUND OF THE INVENTION

1. Field of the Invention

This invention relates to intumescent compositions and more particulary relates to non-flaming intumescent compositions containing a normally selfextinguishing intumescent agent.

2. Description of the Prior Art

It is known that a substrate may be protected from heat and fire by the application of an intumescent composition. Intumescent compositions of the prior art usually contain an intumescent agent having at least three components, i.e., a carbonific, a spumific, and a catalyst; and they are typically characterized by the disadvantages of high cost, low spreading rate, relatively poor efficiency, poor water resistance, and poor weatherability.

As disclosed in U.S. Pat. No. 3,535,130, it has been discovered that a one-component intumescent agent has advantages over multicomponent intumescent agents. However, the intumescent agents of the patent have poor adherence to substrates and have an undesirable degree of moisture sensitivity.

Improved one-component intumescent agents having good efficiency, a low level of moisture sensitivity, and good adherence to substrates are disclosed in copending applications Ser. Nos. 196,229, filed Nov. 5, 1971; 211,635, filed Dec. 23, 1971; 219,875, filed Jan. 21, 1972; 225,638, 225,639, 225,650, 225,660, and 225,661, filed Feb. 11, 1972; 228,381, 228,382, 228,383, and 228,384, filed Feb. 22, 1972; and 230,101, 230,133, 230,134, 230,135, and 230,136, filed Feb. 28, 1972, all in the name of Shirley H. Roth; and 211,636, filed Dec. 23, 1971, in the names of Shirley H. Roth and Joseph Green. These new intumescent agents are satisfactory for most applications, but many of them intumesce with a slight self-extinguishing flame which makes them less desirable for applications having very stringent requirements. It would therefore be desirable to render these normally self-extinguishing compounds non-flaming.

SUMMARY OF THE INVENTION

An object of this invention is to provide novel intumescent compositions.

Another object is to render normally self-extinguishing intumescent agents non-flaming.

These and other objects are attained by mixing a normally self-extinguishing intumescent agent with an amine having a nitrogen or combined nitrogen-halogen content of at least about 30% by weight.

DESCRIPTION OF THE PREFERRED EMBODIMENTS

The compositions which are rendered non-flaming in accordance with the invention are those comprising a normally self-extinguishing intumescent agent, i.e., an agent which intumesces with a self-extinguishing flame. Although the invention is applicable to the improvement of any composition containing such an intumescent agent, it is particularly applicable to the modification of compositions containing a self-extinguishing, nitrogen-containing sulfonyl compound as the intumescent agent. Such intumescent agents include (A) self-extinguishing compounds corresponding to the formula:

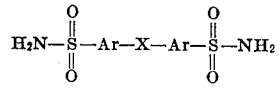

wherein Ar is a divalent aromatic residue and X is a divalent functional group, as taught in the aforementioned copending application Ser. No. 196,229, (B) self-extinguishing compounds corresponding to the formula:

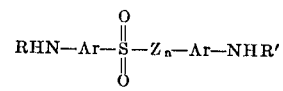

wherein Ar is a divalent aromatic residue; R and R' are hydrogen or a hydrocarbon, halohydrocarbon, or acyl radical; Z is — O—, — S —,

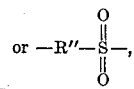

in which R'' is an alkylene radical containing 1–5 carbon atoms; and n is 0 or 1, as taught in the aforementioned copending application Ser. No. 211,635, (c) self-extinguishing compounds corresponding to the formula:

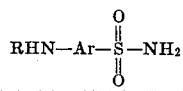

wherein Ar is a divalent aromatic residue and R is hydrogen or a hydrocarbon, halohydrocarbon, or acyl radical, as taught in the aforementioned copending application Ser No. 211,636, (D) self-extinguishing compounds corresponding to the formula:

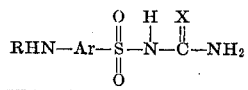

wherein Ar is a divalent aromatic residue, R is hydrogen or a hydrocarbon, halohydrocarbon, or acyl radical, and X is oxygen or sulfur, as taught in the aforementioned copending application Ser. No. 219,875, (E) self-extinguishing compounds corresponding to the formula:

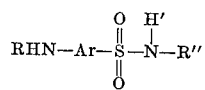

wherein Ar is a divalent aromatic residue, R is hydrogen, hydrocarbon, halohydrocarbon, or acyl, and R'' is a substituted or unsubstituted pyridyl, pyrimidyl, pyridazyl, pyrazyl, pyrazolyl, imidazolyl, thiadiazolyl, oxadiazolyl, thiazolyl, isothiazolyl, oxazolyl, isoxazolyl, triazolyl or aromatic hydrocarbon radical, as taught in the aforementioned copending applications Ser. Nos. 225,638, 225,639, 225,660 225,661, 228,381, 228,382, 228,383, 228,384, 228,660, and (F) self-extinguishing compounds corresponding to the formula:

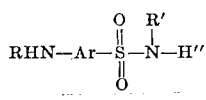

wherein Ar is a divalent aromatic residue, R is a substituted or unsubstituted pyridyl, pyrimidyl, pyrazyl, thiazolyl, isothiazolyl, oxazolyl, isoxazolyl, or triazolyl radical, and R' is hydrogen, hydrocarbon, substituted hydrocarbon, or acyl, as taught in the aforementioned copending applications Ser. Nos. 230,134, 230,135, 230,136, 230,133, and 230,101. The teachings of these copending applications are incorporated herein by reference.

More specific examples of normally self-extinguishing intumescent agents which may be rendered nonflaming in accordance with the present invention are the o,o'-, m,m'-, and p,p'-oxybis (benzenesulfonamides), bis(p-aminophenyl)sulfone, 1,2-bis(4-acetamidophenylsulfonyl)ethane, sulfanilamide, p-acetamidobenzenesulfonamide, p-aminobenzenesulfonylurea, p-aminobenzenesulfonylthiourea, 2-sulfanilamidopyridine, 3-sulfanilamidopyridine, 4-sulfanilamidopyridine, 2-sulfanilamidopryimidine, 4-sulfanilamidopyrimidine, 5-sulfanilamidopyrimidine, 3-sulfanilamidopyridazine, 2-sulfanilamidopyrazine, 2-sulfanilamidobenzopyrazine, 3-sulfanilamidopyrazole, 2-sulfanilamidoimidazole, 3-methyl-1-phenyl-5-sulfanilamidopyrazole, 2-phenyl-3-sulfanilamidopyrazole, 2-sulfanilamido-1,3,4-thiazole, 5-methyl-2-sulfanilamido-1,3,4-thiadiazole, 5-ethyl2-sulfanilamido-1,3,4-thiadiazole, 5-methyl-3-sulfanilamido-1,2,4-oxadiazole, 4-phenyl-3-sulfanilamido-1,2,5-oxadiazole, 2-sulfanilamidothiazole, 2-sulfanilamido-4-methylthiazole, 5-sulfanilamido-3-methylisothiazole, 2-sulfanilamido-4,5-dimethyloxazole, 3-sulfanilamido-5-methylisoxazole, 1-sulfanilamido-1,2,3-triazole, 3-sulfanilamido1,2,4-triazole, 4-sulfanilamido-1,2,4-triazole, sulfanilamidobenzene, N⁴-2-pyridylsulfanilamide, N⁴-2-quinolylsulfanilamide, N⁴-2-pyrimidylsulfanilamide, N⁴-4-pyrimidylsulfanilamide, N⁴-5-pyrimidylsulfanilamide, N⁴-2-pyrazylsulfanilamide, N⁴-2-thiazolylsulfanilamide, N⁴-1,2,4-triazol-3-ylsulfanilamide, etc.

The amine which is mixed with the normally selfextinguishing intumescent agent may be any amine having a nitrogen or combined nitrogen-halogen content of at least about 30% by weight. Thus, it may be aliphatic, aromatic, or heterocyclic, and it may bear any halo substituent as well as other substituents. However, it is usually preferred that the amine be water-insoluble. The term "amine" is used herein in the generic sense which includes amines, imines, amides, and imides.

Exemplary of suitable amines are guanidine, dicyandiamide, urea, formamide, 2-chloroacetamide, ethylenediamine, diethylenetriamine, hexamethylenetetramine, N,N'-(1,2-ethane)-bis(5,6-dibromonorbornane-2,3-dicarboximide), N,N'-bis(5,6-dibromonorbornane-2,3-dicarboximide), N-(2,3-dibromopropyl)-5,6-dibromonorbornane-2,3-dicarboximide, N-phenyl-5,6-dibromonorbornane-2,3-dicarboximide, o-bromoaniline, p-bromoacetanilide, 2,3-diaminopyridine, 2-bromopyridine, pyrazine, pyrimidine, 2-aminopyrimidine, 2-amino-4-methylpyrimidine, 4,5-diaminopyrimidine, pyridazine, pyrazole, purine, 6-aminopurine, 2,6-dichloropurine, triazole, 2-amino-5-ethyl-1,3,4-thiadiazole, melamine, melam, melem, triaminomelamine, trichloromelamine, tribromomelamine, dibromomelamine, bromomelamine, diethylmelamine, butylmelamine, dimethylmelamine, trimethylmelamine, phenylmelamine, trimethylolmelamine, melamine chloroacetate, melamine dichloroacetate, melamine phosphate, melamine metaphosphate, melamine pyrophosphate, melamine sulfate, the sulfonamidophenylmelamines [i.e., 2-(p-sulfonamidoanilino)-4,6-diamino-1,3,5-triazine, 2,4-bis(p-sulfonamidoanilino)-6-amino-1,3,5-triazine, 2,4,6-tris(p-sulfonamidoanilino)-1,3,5-triazine, etc.], the aminobenzenesulfonylmelamines [i.e., 2-(p-aminobenzenesulfonamido)-4,6-diamino-1,3,5-triazine, 2,4bis(p-aminobenzenesulfonamido)-6-amino-1,3,5-triazine, 2,4,6-tris(p-aminobenzenesulfonamido)-1,3,5-triazine, etc.], etc., and mixtures thereof. The preferred amines are melamine, melamine derivatives, and other cyclic compounds.

The amine is mixed with the normally selfextinguishing intumescent agent in any suitable manner, e.g., by grinding the ingredients together, to provide an admixture containing about 0.5–250%, preferably about 5–150%, of amine, based on the weight of the intumescent agent. Smaller amounts of amine are usually inadequate to render the intumescent agents non-flaming; larger amounts generally decrease the degree of intumescence too much. Ordinarily the less efficient amines are used in concentrations toward the upper end of the aforementioned range, while the more efficient amines are used in the lower concentrations.

For use in protecting a substrate from heat and fire, the non-flaming intumescent agent/amine compositions of the invention may be applied in any suitable manner, e.g., electrodeposition, spraying of powdered intumescent agent/amine composition onto an adhesive substrate, etc. However, it is usually preferred to compound the intumescent agent and amine with a binder, e.g., nitrocellulose, and optionally also with one or more of the other ingredients conventionally used in intumescent compositions, e.g., stabilizers, dispersing agents, pigments, driers, biocides, anti-foamers, thickeners, protective colloids, fillers, blowing agents, etc.; disperse the composition in a suitable liquid medium, e.g., water or a solvent or solvent mixture; and apply the coating composition thus formed to the substrate to be protected. As is the case with conventional intumescent coating compositions, it is frequently convenient to apply these coating compositions in the form of a paint having a solids content of about 10–70% by weight and an intumescent agentamine/binder weight ratio of about 0.075–14/1 to deposit a coating having a dry thickness of about 0.001–0.75 inch.

The intumescent agents of the invention are efficient, have low moisture sensitivity, and intumesce without flaming to form foams having good volume, cell structure, and adherence to substrates, such as wood, metal, and plastics. They are also useful as flame retardants in normally flammable compositions.

The following examples are given to illustrate the invention and are not intended as a limitation thereof. Unless otherwise specified, quantities mentioned are quantities by weight.

EXAMPLE I - CONTROL

Place one gram of sulfanilamide in an aluminum pan and flame it with a propane torch. The compound intumesces with a slight self-extinguishing flame to form an excellent volume of foam having a good cell structure.

EXAMPLE II

Repeat Example I except for intimately mixing one part of the sulfanilamide with 1.4 parts of melamine before applying the propane torch. The mixture intumesces without flaming to form a good but lesser volume of foam having a good cell structure.

EXAMPLE III - CONTROL

Place one gram of p,p'-oxybis (benzenesulfonamide) in an aluminum pan and flame it with a propane torch. The compound intumesces with a slight self-extinguishing flame to form an excellent volume of foam having a good cell structure.

EXAMPLE IV

Repeat Example III except for intimately mixing one part of the p,p'-oxybis(benzenesulfonamide) with 0.25 part of melamine before applying the propane torch. The mixture intumesces without flaming to form a good but lesser volume of foam having a good cell structure.

EXAMPLE V

Repeat Examples II and IV except for replacing the melamine with 0.005-2.5 parts of urea, guanidine, dicyandiamide, and tribromomelamine, respectively. Similar results are observed.

Similar results are also observed with the other amines and self-extinguishing intumescent agents mentioned in the specification are substituted for those of the preceding Examples except that - as demonstrated below - the volume of foam produced by intumescence is not necessarily decreased by the addition of the amine.

EXAMPLE VI

Repeat Example III except for intimately mixing one part of the p,p'-oxybis(benzenesulfonamide) with 0.2 part of N-phenyl-5,6-dibromonorbornane-2,3-dicarboximide before applying the propane torch. The mixture intumesces without flaming to form a foam comparable in volume and cell structure to the foam of Example III.

EXAMPLE VII

Repeat Example III except for intimately mixing one part of the p,p'-oxybis(benzenesulfonamide) with 0.2 part of N,N'-(1,2-ethane)-bis(5,6-dibromonorbornane2,3-dicarboximide) before applying the propane torch. The mixture intumesces without flaming to form a foam comparable in volume and cell structute to the foam of Example III.

It is obvious that many variations may be made in the products and processes set forth above without departing from the spirit and scope of this invention.

What is claimed is:

1. A non-flaming intumescent composition consisting essentially of:

A. a normally self-extinguishing intumescent agent selected from the group consisting of:

1. self-extinguishing compounds corresponding to the formula:

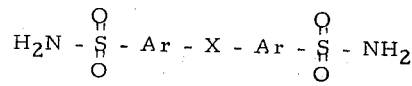

wherein Ar is a divalent aromatic residue and X is a divalent functional group, 2. self-extinguishing compounds corresponding to the formula:

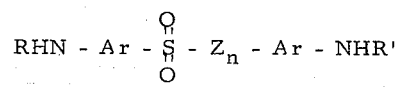

wherein Ar is a divalent aromatic residue; R and R' are hydrogen or a hydrocarbon, halohydrocarbon, or acyl radical; Z is — O —, — S —, or

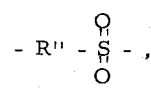

in which R' is an alkylene radical containing 1-5 carbon atoms; and $n$ is 0 or 1, 3. self-extinguishing compounds corresponding to the formula:

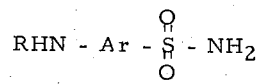

wherein Ar is a divalent aromatic residue and R is hydrogen or a hydrocarbon, halohydrocarbon, or acyl radical, 4. self-extinguishing compounds corresponding to the formula:

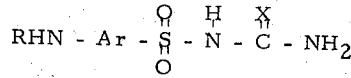

wherein Ar is a divalent aromatic residue, R is hydrogen or a hydrocarbon, halohydrocarbon, or acyl radical, and X is oxygen or sulfur, 5. self-extinguishing compounds corresponding to the formula:

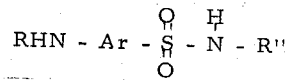

wherein Ar is a divalent aromatic residue; R is hydrogen, hydrocarbon, halohydrocarbon, or acyl; and R" is a substituted or unsubstituted pyridyl, pyrimidyl, pyridazyl, pyrazyl, pyrazolyl, imidazolyl, thiadiazolyl, oxadiazolyl, thiazolyl, isothiazolyl, oxazolyl, isoxazolyl, triazolyl, or aromatic hydrocarbon radical, and 6. self-extinguishing compounds corresponding to the formula:

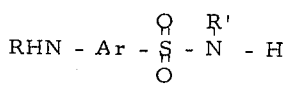

wherein Ar is a divalent aromatic residue, R is a substituted or unsubstituted pyridyl, pyrimidyl, pyrazyl, thiazolyl, isothiazolyl, oxazolyl, isoxazolyl, or triazolyl radical, and R' is hydrogen, hydrocarbon, substituted hydrocarbon, or acyl and B. about 0.5–250%, based on the weight of the intumescent agent, of a nitrogen compound selected from the group consisting of amines, imines, amides, and imides having a nitrogen content of at least about 30% by weight or a combined nitrogen-halogen content of at least about 30% by weight.

2. The composition of claim 1 wherein the concentration of said nitrogen compound is about 5–150%, based on the weight of the intumescent agent.

3. The composition of claim 1 wherein the said nitrogen compound is melamine.

4. The composition of claim 1 wherein said nitrogen compound is N-phenyl-5,6-dibromonorbornane-2,3-dicarboximide.

5. The composition of claim 1 wherein said nitrogen compound is N,N'-(1,2-ethane)-bis(5,6-dibromonorbornane-2,3-dicarboximide).

6. The composition of claim 1 wherein the intumescent agent is p,p'-oxybis(benzenesulfonamide).

7. The composition of claim 1 wherein the intumescent agent is bis(p-aminophenyl)sulfone.

8. The composition of claim 1 wherein the intumescent agent is 1,2-bis(4-acetamidophenylsulfonyl)ethane.

9. The composition of claim 1 wherein the intumescent agent is sulfanilamide.

10. The composition of claim 1 wherein the intumescent agent is p-acetamidobenzenesulfonamide.

* * * * *

PO-1050
(5/69)

UNITED STATES PATENT OFFICE
CERTIFICATE OF CORRECTION

Patent No. 3,855,138      Dated December 17, 1974

Inventor(s) Shirley H. Roth

It is certified that error appears in the above-identified patent and that said Letters Patent are hereby corrected as shown below:

Column 3, line 1, "228,660" should read -- 225,660 --.

Signed and sealed this 4th day of March 1975.

(SEAL)
Attest:

RUTH C. MASON
Attesting Officer

C. MARSHALL DANN
Commissioner of Patents
and Trademarks